United States Patent [19]

Rossin et al.

[11] Patent Number: 5,851,950
[45] Date of Patent: Dec. 22, 1998

[54] CATALYTIC OXIDATION OF ORGANIC NITROGEN CONTAINING COMPOUNDS

[75] Inventors: Joseph A. Rossin, Forest Hill; Jeffrey M. Campbell, Perry Hall, both of Md.

[73] Assignee: Guild Associates, Inc., Hilliard, Ohio

[21] Appl. No.: 802,388

[22] Filed: Feb. 18, 1997

Related U.S. Application Data

[63] Continuation of Ser. No. 505,800, Jul. 21, 1995.

[51] Int. Cl.$^6$ ........................................................... B01J 33/00
[52] U.S. Cl. ............................ 502/349; 502/350; 502/351; 423/235; 423/236
[58] Field of Search .................................... 502/349, 350, 502/351; 423/235, 236

[56] References Cited

U.S. PATENT DOCUMENTS

| 5,380,692 | 1/1995 | Nakatsuji et al. ........................ 502/303 |
| 5,527,755 | 6/1996 | Wenski et al. ............................ 502/325 |

Primary Examiner—Deborah Jones
Assistant Examiner—Amy M. Harding
Attorney, Agent, or Firm—Bardehle, Pagenberg, Dost, Altenburg, Frohwitter, Geissler

[57] ABSTRACT

A method of treating a gaseous stream containing one or more volatile nitrogen containing organic compounds which comprises contacting the gaseous stream and an oxidizing agent with a catalyst at relatively low temperatures to cause oxidation of the volatile nitrogen-containing organic compounds. The catalyst employed promotes the oxidation reaction to selectively produce $N_2O$, $N_2$, $CO_2$ and $H_2O$ without generating significant amounts of $NO_x$ to permit the reaction products to be vented directly into the atmosphere. The catalyst includes a selected amount of a noble or base metal deposited on a catalyst support comprising titania and zirconia. One or more of the elements molybdenum, tungsten or vanadium are added as promoters to the composition which minimizes the generation of $NO_x$ among the reaction products. Lanthanum may be added to provide better thermal stability and increase the selectivity for producing $N_2$ among the reaction products. The process is effective when the gas stream also includes other non-nitrogen containing organic compounds or $NO_x$ mixed with the nitrogen organic compound being treated without generating significant amounts of $NO_x$ in the reaction products.

15 Claims, 1 Drawing Sheet

| T °C | [HCN] | [$CO_2$] | [CO] | [$N_2$] | [$N_2O$] | [$NO_x$] |
|---|---|---|---|---|---|---|
| 450 | <0.1 ppm | 2024 ppm | <5 ppm | 778 ppm | 127 ppm | 312 ppm |
| 440 | <0.1 ppm | 2043 ppm | <5 ppm | 846 ppm | 140 ppm | 141 ppm |
| 430 | <0.1 ppm | 2035 ppm | <5 ppm | 878 ppm | 160 ppm | 48 ppm |
| 420 | <0.1 ppm | 2053 ppm | <5 ppm | 898 ppm | 182 ppm | 5 ppm |
| 410 | <0.1 ppm | 2061 ppm | <5 ppm | 867 ppm | 211 ppm | <1 ppm |
| 400 | <0.1 ppm | 2062 ppm | <5 ppm | 835 ppm | 251 ppm | <1 ppm |
| 390 | <0.1 ppm | 2089 ppm | <5 ppm | 822 ppm | 275 ppm | <1 ppm |
| 380 | <0.1 ppm | 2079 ppm | <5 ppm | 842 ppm | 256 ppm | <1 ppm |
| 370 | <0.1 ppm | 2091 ppm | <5 ppm | 885 ppm | 211 ppm | <1 ppm |
| 360 | <0.1 ppm | 2114 ppm | <5 ppm | 914 ppm | 183 ppm | <1 ppm |
| 350 | <0.1 ppm | 2103 ppm | <5 ppm | 915 ppm | 174 ppm | <1 ppm |

| T°C | [HCN] | [CO₂] | [CO] | [N₂] | [N₂O] | [NOₓ] |
|---|---|---|---|---|---|---|
| 450 | <0.1 ppm | 2024 ppm | <5 ppm | 778 ppm | 127 ppm | 312 ppm |
| 440 | <0.1 ppm | 2043 ppm | <5 ppm | 846 ppm | 140 ppm | 141 ppm |
| 430 | <0.1 ppm | 2035 ppm | <5 ppm | 878 ppm | 160 ppm | 48 ppm |
| 420 | <0.1 ppm | 2053 ppm | <5 ppm | 898 ppm | 182 ppm | 5 ppm |
| 410 | <0.1 ppm | 2061 ppm | <5 ppm | 867 ppm | 211 ppm | <1 ppm |
| 400 | <0.1 ppm | 2062 ppm | <5 ppm | 835 ppm | 251 ppm | <1 ppm |
| 390 | <0.1 ppm | 2089 ppm | <5 ppm | 822 ppm | 275 ppm | <1 ppm |
| 380 | <0.1 ppm | 2079 ppm | <5 ppm | 842 ppm | 256 ppm | <1 ppm |
| 370 | <0.1 ppm | 2091 ppm | <5 ppm | 885 ppm | 211 ppm | <1 ppm |
| 360 | <0.1 ppm | 2114 ppm | <5 ppm | 914 ppm | 183 ppm | <1 ppm |
| 350 | <0.1 ppm | 2103 ppm | <5 ppm | 915 ppm | 174 ppm | <1 ppm |

CATALYTIC OXIDATION OF ORGANIC NITROGEN CONTAINING COMPOUNDS

This application is a continuation under 37 CFR § 1.60 of prior application Ser. No. 08/505,800 filed Jul. 21, 1995.

TECHNICAL FIELD

The present invention relates generally to catalytic oxidation processes and particularly to the catalytic oxidation of gaseous nitrogen-containing compounds typically present in industrial off-gas streams.

BACKGROUND ART

Volatile nitrogen-containing organic compounds, referred to herein as "VNC's", such as amines and nitrites, for example, must be removed from industrial off-gas streams prior to venting the gas stream into the atmosphere. Thermal incineration and catalytic oxidation are two destructive methods which may be used for controlling off-gas emissions. Thermal incineration of off-gas streams containing VNC's generates both thermal and chemical nitrogen dioxide ($NO_2$) and nitric oxide (NO) (hereinafter referred to collectively as $NO_x$) which are the most prevalent forms of nitrogen oxide present in measurable quantities in the atmosphere.

Thermal generated $NO_x$ gases are the result of oxidation of nitrogen ($N_2$) and occurs at high operating temperatures, while chemical generated $NO_x$ gases result from reactions involving the atomic nitrogen associated with volatile nitrogen containing compounds.

It is well known that $NO_x$ gases are a leading constituent of smog and acid rain. Further, they have been linked to depletion of stratospheric ozone. While these gases are produced from natural sources, manmade sources can result in higher than desirable concentrations and therefore control of these emissions is desirable. The use of thermal incineration to decompose VNC's requires a costly $NO_x$ abatement process to be employed to control the $NO_x$ emissions.

Catalytic oxidation process for decomposition of VNC's have the advantage of operating at much lower temperatures than incineration processes and thus remove the mechanism to generate thermal $NO_x$. However, there is still the potential to produce chemical $NO_x$ due to the nitrogen associated with the VNC's. Recent studies by Lester and Homeyer presented at the 1993 Meeting of the American Chemical Society in Denver, Colo. have reported the catalytic oxidation of a number of VNC's over proprietary supported platinum catalyst on behalf of Allied Signal Inc. This catalyst was able to readily destroy the VNC's tested; however significant quantities of $NO_x$ were generated. Therefore, use of this catalyst in a process to destroy VNC's would also require an additional abatement treatment of the $NO_x$ gases generated.

Kuwabara, et al (Chem. Lett., 1992) describe the use of copper-exchanged zeolites as catalysts to oxidatively destroy trimethylamine without the formation of significant amounts of $NO_x$. The apparently most successful catalyst used was a copper containing ZSM-5 which is a crystalline molecular sieve. However, such a catalyst is subject to poisoning by sulphur or halogen compounds often found in industrial off-gas streams. Further, crystal and zeolite molecular sieves are relatively costly to prepare for industrial applications.

A 1993 article by Rosenburg et al. provides an overview of selective catalytic reduction of $NO_x$ emissions involving the addition of ammonia to a $NO_x$ stream in the presence of a catalyst consisting of vanadium supported on titania. These processes are useful to control $NO_x$ emissions with the addition of ammonia being necessary. However, this process is not useful to oxidatively destroy the VNC's without the formation of $NO_x$.

There is a need to develop improved catalytic oxidation processes capable of destroying VNC's which do not generate $NO_x$ emissions and thereby do not require further costly $NO_x$ abatement operations such as the one described in Rosenburg et al.

BRIEF DISCLOSURE OF INVENTION

The present invention relates to a process where oxidatively decomposing VNC's without producing significant amounts of $NO_x$ emissions. The process of the present invention comprises catalytically oxidizing VNC's using a catalyst which includes a noble or base metal deposited on a catalyst support comprising zirconia or titania and promoted by additions of vanadium, molybdenum or tungsten in the presence of an oxidizing agent. Lanthanum is a preferred addition for thermal stabilization of the catalyst.

More particularly, a gaseous stream containing one or more VNC's is passed through a catalyst bed at a selected temperature range to obtain an oxidation reaction which selectively produces $CO_2$, $H_2O$, $N_2$, $N_2O$ and trace amounts, if any, of $NO_x$ products. The process may be operated at temperatures ranging from 200° to 500° C. depending upon the particular composition of the catalyst described above, the residence time and the particular constituents present in the incoming gas stream as well as the concentration thereof.

Further, the process according to the present invention also is effective to decompose VNC's in a gas stream which include certain gaseous hydrocarbons or $NO_x$, or a mixture thereof, wherein the compounds are reacted without producing significant amounts of $NO_x$, and the $NO_x$ component in the feedstream is reduced.

Therefore, the processed and catalyst composition employed in accordance with the present invention can effectively decompose VNC's at relatively low operating temperatures without generating $NO_x$ in any significant amounts to permit control of VNC's and $NO_x$ emissions into the atmosphere in an economical manner which does not need a separate and costly $NO_x$ abatement operation.

BRIEF DESCRIPTION OF THE DRAWINGS

FIG. 1 is a table showing the reaction products of a process according to the present invention decomposing hydrogen cyanide as a function of temperature using the method described in Example II over a selected temperature range.

DETAILED DESCRIPTION

The present invention relates to a novel catalytic oxidation process to control VNC emissions from industrial off-gas streams vented into the atmosphere without generating significant amounts of $NO_x$. The process according to the present invention employs a catalyst composition which comprises a nobel or base metal supported on titania or zirconia and may be promoted with selected amounts of molybdenum, tungsten or vanadium. This catalyst composition has been discovered to possess the ability to effectively destroy VNC's in oxidizing environments without generating significant $NO_x$ emissions over selected relatively low temperature ranges.

In general, effective catalyst compositions contain about 0.03% to 5% of a nobel metal or about 0.1% to 10% of a base metal which is impregnated onto either a titania or zirconia support. Between about 1% to 20% of molybdenum, tungsten or vanadium, or a combination thereof, is added as a promoter of the selective oxidation reaction and about 1% to 7% lanthanum is a preferred addition to promote thermal stability of the catalyst and appears to enhance the selectively towards the formation of nitrogen among the reaction products. All percentages of catalyst components expressed herein are on a weight basis of the total formulation unless otherwise specifically designated.

A preferred catalyst formula contains between 0.1% to 3% of a noble metal, such as palladium or platinum, and between 3% to 7% vanadium impregnated onto a titania support which forms the balance of the formulation. It is more preferred to include between 1% to 5% lanthanum. Tungsten can be substituted for vanadium or molybdenum but is less preferred than either of these components in the formulation. The catalyst may be used in any configuration or size which sufficiently exposes the catalyst to the gas stream being treated. Preferably, the titania or zirconia support possesses a high surface area to obtain better dispersion of the components of the catalyst. The catalyst may be configured in many typical and well known forms such as, for example, pellets, granules, rings, spheres or cylinders, or may take the form of a coating on an inert carrier, such as spheres or monoliths. The monolithic form may be preferred when it is desired to reduce the pressure drop through the system or minimize attrition or dusting.

The catalytic components may be dispersed onto either the titania or zirconia support by means well known to the art. In general, it is desired that the promoters be impregnated onto the support first, followed by impregnation of the noble or base metals. For example, molybdenum, tungsten or vanadium, or a combination of these, may be dispersed onto either the titania or zirconia support by impregnating granules with a solution containing one or both of these compounds. Following impregnation the granules may be dried and/or calcined at the desired temperatures then impregnated with a solution containing a base or noble metal. In both instances, the solution may be either aqueous or nonaqueous. Once the impregnation step is completed the resulting catalyst may be dried and/or calcined.

When it is desired to add lanthanum to the catalyst, lanthanum may be added to the solution containing the molybdenum, tungsten and/or vanadium. Alternatively, the lanthanum impregnation may be performed either prior to or following impregnation with molybdenum, tungsten and/or vanadium.

If a monolithic form of the catalyst is desired, a slurry or solution of titania, zirconia, titania plus promoters, or zirconia plus promoters may be first coated onto the monolith by means well known to the art. It is desirable that the amount of support material plus the promoters coated onto the monolith be in the range of about 25 to 350 g/liter. The noble or base metal can be added in any convenient manner to the other components, but preferably is added last using well known conventional means to accomplish uniform impregnation of the metal onto the coated monolithic support.

The process involves passing a gas stream containing VNC's plus an oxidizing agent, such as air, through a catalyst bed consisting of the catalyst described herein. The flow rates through the system should be sufficient to allow for greater than at least 90% and preferably greater than 95% destruction of the VNC's and any other undesirable compounds of interest. Thus, the Gas Hourly Space Velocity (GHSV) can vary significantly over a range of about 1,000 to about 300,000 hours$^{-1}$ and preferably over a range of about 5,000 to 60,000 hours$^{-1}$.

The process described according to the present invention is also applicable to the injection of liquid nitrogen-containing compounds into a gas stream consisting of inert compounds plus an oxidizing agent air for example. The gas stream flow rate and temperature and rate of liquid injection are such as to allow for the vaporization of the nitrogen-containing compounds. The gas stream containing the vaporized nitrogen-containing compounds is then contacted with the catalyst described herein.

It should be noted that in the formulation of the catalyst, the components, particularly the noble or base metal should be highly dispersed throughout the particular configuration used. The degree of metal dispersion can effect the efficiency of the chemical reaction desired. Further, the dispersion of the components on the form used can also effect the temperature range and the residence time required to obtain the desired conversion percentage of the VNC's being treated. Alternatively, the better dispersion of the metals can reduce the quantity of the components needed to achieve a given efficiency of the reaction at the same operating temperature and residence time. It should also be noted that after the gas stream has been treated in accordance with the present invention, further treatment, if desired, may be effected to remove the smaller quantities of $N_2O$ which may be required to achieve the future emission standard. Also, halogen containing organic compounds included in the gas stream, including those containing atomic nitrogen, also can be oxidized in accordance with the present invention resulting in the production of acid gases. If the concentration of such acid gases in the exiting gas stream are deemed unacceptable, conventional collection or abatement processes may be employed to avoid venting acid gases directly into the atmosphere.

The reaction temperature range within which the process is operated is based on a number of factors which include the concentration of the target VNC to be decomposed, the reactivity level of the target VNC, the space velocity and the percentage of the noble or base metal associated with the catalyst. Generally, lower operating temperatures may be employed for VNC compounds which are readily oxidized by the catalyst or for those present in relatively low concentrations in the incoming gas stream, less than about 500 ppm for example. Further, the operating temperature may be reduced by decreasing the space velocity of the incoming gas stream and/or increasing the percentage of the base for noble metal component associated with the catalyst.

It should also be pointed out that the process parameter is noted herein which include varying the composition of the catalyst with respect to the percentages of the promotor elements, such as molybdenum, tungsten, and vanadium for example, also alter the selectivity of the nitrogen-containing reaction products generated. This provides one the ability to design the process to achieve the most desirable result when actual operation in a particular industrial application tends to set certain limits on certain process parameters. Using certain catalyst compositions demonstrate, for example, that selectively producing very low percentages of $NO_x$ occur within a given temperature range and therefore higher or lower operating temperatures need to be avoided unless other operating parameters are appropriately adjusted, such as space velocity for example. The relatively wide range of suitable operating conditions which produce useful results is a significant advantage in using the process according the present invention.

It should also be noted that since oxidation reaction of the VNC's are exothermic, the temperature of the incoming gas stream can be treated should be adjusted to take into account the potential for the reaction temperature at the catalyst bed to be higher due to the heat generated by the chemical reactions so that the catalyst temperature does not exceed a level such that $NO_2$ formation becomes significant.

The composition of the catalyst reported in the following examples of the present invention is stated in percent by weight and was calculated based upon the elements described in the catalyst. Therefore, an appropriate amount of a salt is used so that the weight percent of the metal component derived from the salt is included in the catalyst as described in the examples. When the solution of the salt is evaporated, the salt remains associated with the titania or zirconia support until calcination. At this point, the salts convert into metal and/or metal oxides. No formal analysis, such as atomic absorption, was performed to obtain an accurate measure of the catalyst composition. In view of the relatively wide range of catalyst formations found to be operable within the general ranges disclosed, highly precise determinations of the catalyst determinations were not deemed necessary.

The selectivity of the nitrogen-containing reaction products is noted herein and calculated on the basis of the available atomic nitrogen present in the VNC in the incoming stream.

The concentrations of $CO_2$, $N_2O$, and $N_2$ in the reactor effluent in the following examples described herein were determined using gas chromatographic techniques which employed packed columns to perform the separation and a thermal conductivity detector to quantitatively determine the product concentration. The concentration of VNC in the feed and effluent streams was determined using gas chromatographic techniques which employed a packed column to perform the separation. A flame ionization detector was used to provide quantitative analysis. The concentration of $NO_x$ and the reactor effluent was determined using a chemiluminescent $NO/NO_x$ analyzer which employed an optical filter and photomultiplier. These analytical techniques are well known to those skilled in the art.

Further, the addition of the promoters to the catalyst composition described herein have a slight retarding effect on the catalytic activity; however, these components have been found to dramatically minimize $NO_x$ formation in the process according to the present invention. Also, the inclusion of a noble or base metal in the catalyst composition not only significantly enhances the reactivity of the catalyst, but further dramatically minimizes the formation of $NO_x$ in the reaction products. If either the noble or base metal promoters described herein are omitted from the catalyst composition, the generation of $NO_x$ and the reaction products is increased several hundred fold or the oxidation of the VNC is decreased several hundred fold under the same processing conditions. Therefore, both of these constituents are required in the catalyst composition and cooperate to achieve the improved results of effectively decomposing VNC's while minimizing generation of $NO_x$ among the reaction products. In view of the above description and examples of the process according to the present invention which follow, it should be understood by those skilled in the art that the present invention provides a process and catalyst formulation which very effectively destroys VNC's without generating significant amounts of the undesirable $NO_x$ gases. Further, the catalyst formulations disclosed herein are not readily subject to poisoning many organic compounds which may be present in a wide variety of industrial off-gas applications.

The economic impact of such a process which does not require costly additional $NO_x$ abatement operations represents a novel and valuable contribution to the state of the art.

EXAMPLE I

A catalyst was prepared on a weight basis containing nominally 1% platinum, 5% vanadium and 5% lanthanum with the balance titania as follows: 25 g of primarily anatase phase titania (Degussa p-25) with a surface area of approximately 50 $m^2/g$ was slurried into 250 ml distilled, deionized water. To the slurry was added 2.9 g lanthanum nitrate hydrate dissolved in 30 ml distilled water. The slurry was then placed in a rotary evaporator at 45° C. and the water was evaporated from the slurry overnight. The remaining solid was dried at 125° C. for stet hours, then crushed and sieved to 25/60 mesh granules. The granules were then calcined at 450° C. for four hours. Approximately 8 g of the resulting granules were slurried in 200 ml distilled, deionized water. To the slurry was added approximately 0.9 g ammonium metavanadate dissolved in 80 ml distilled, deionized water. The slurry was then placed in a rotary evaporator at 60° C. and the water was evaporated overnight. The remaining solids were dried at 125° C. for two hours then calcined at 450° C. for four hours. Approximately 2.0 g of the resulting granules were slurried in 50 ml distilled deionized water. Then, 0.04 g tetramineplatinum nitrate dissolved in 25 ml distilled, deionized water was added to the slurry. The slurry was placed in a rotary evaporator at 60° C. and the water was evaporated overnight. The resulting material was dried at 125° C. for two hours, then reduced in a hydrogen environment for two hours at 450° C., then calcined at 450° C. for two hours. Approximately one gram of the resulting material containing nominally 1% Pt, 5% V, 5% La supported on $TiO_2$ was exposed to 2000 ppm (v\v) hydrogen cyanide in 21% $O_2$\He following at 200 ml/min at 350° C. At this temperature, the conversion of hydrogen cyanide was greater than 99.95%. The reaction product distribution consisted of 8 ppm $NO_x$, 100 ppm $N_2O$, 970 ppm $N_2$ and 2,100 parts per million $CO_2$. No carbon monoxide or products of partial oxidation were detected.

EXAMPLE II

A catalyst was prepared containing nominally 1% palladium, 5% vanadium, 5% lanthanum with the balance titania as follows: Approximately 2.0 g of the granules prepared containing (nominally) 5% vanadium, 5% lanthanum with the balance titania according to Example I were slurried in 50 ml distilled, deionized water. Approximately 0.05 g tetraaminepalladium chloride dissolved in 10 ml distilled, deionized water was added to the slurry. The slurry was placed in a rotary evaporator at 60° C. and then was evaporated overnight. The resulting material was dried at 125° C. for two hours then reduced in a hydrogen environment at 450° C. for two hours then calcined at 450° C. for two hours. Approximately one gram of the resulting material containing nominally 1% Pd, 5% V, 5% La supported on $TiO_2$ was exposed to 2,000 ppm (v\v) hydrogen cyanide and 21% $O_2$\He flowing at 200 ml/min. The catalyst was exposed to the feed stream described at temperatures between 350° C. and 450° C. The concentration of the reaction products formed at ten degree intervals are listed in FIG. 1. In the temperature range between 350° C. to 420° C., greater than 99.95% of the hydrogen cyanide was destroyed without generation of more than five parts per million of $NO_x$. The catalyst was then exposed to 2,000 ppm hydrogen cyanide continuously for 24 hours at 370° C. The conversion of hydrogen cyanide was greater than 99.95% throughout the duration of the run. The $NO_x$ selectivity was less than 1% throughout the duration of the run.

EXAMPLE III

A catalyst was prepared containing nominally 5% chromium, 5% vanadium, 5% lanthanum with the balance of titania as follows: Approximately 2.0 g of the (nominally) 5% V/5% La/$TiO_2$ granules prepared according to example I where slurry in 50 ml distilled, deionized water. Approximately 0.76 g chromium nitrate nonahydrate dissolved in 25 ml distilled, deionized water was added to the slurry. The slurry was placed in a rotary evaporator at 60° C. and the water was evaporated overnight. The resulting material was dried at 125° C. for two hours, then reduced in a hydrogen environment at 450° C. for two hours, then calcined at 450° C. for two hours. Approximately one gram of the resulting material containing nominally 5% Cr, 5% V, 5% La supported on $TiO_2$ was exposed to 2,000 ppm (v/v) hydrogen cyanide in 21% $O_2$/He flowing at 200 ml/min at 400° C. At 400° C., the conversion of hydrogen cyanide was greater than 99.95%. The reaction product distribution consisted of 19 ppm $NO_x$, 560 ppm $N_2O$, 585 ppm $N_2$ and 2,250 ppm $CO_2$. No carbon monoxide or products of partial oxidation were detected at this temperature.

EXAMPLE IV

A catalyst was prepared containing nominally 1% palladium, 3% vanadium, 5% lanthanum with a balance titania in a manner similar to that described previously. Approximately one gram of the resulting material was exposed to 2,000 ppm (v/v) hydrogen cyanide in 21% $O_2$/He flowing at 200 ml/min at 350° C. At 350° C., the conversion of hydrogen cyanide was greater than 99.95%. The reaction product distribution consisted of 7 ppm $NO_x$, 75 ppm $N_2O$, 950 ppm $N_2$ and 2,285 ppm $CO_2$. No carbon monoxide or products of partial oxidation were detected at this temperature.

EXAMPLE V

A catalyst was prepared containing nominally 1% palladium, 7% vanadium, 5% lanthanum with a balance titania in a manner similar to that described previously. Approximately one gram of the resulting material was exposed to 2,000 ppm (v/v) hydrogen cyanide in 21% $O_2$/He flowing at 200 ml/min at 350° C. At 350° C., the conversion of hydrogen cyanide was greater than 99.95%. The reaction product distribution consisted of 11 ppm $NO_x$, 221 ppm $N_2O$, 750 ppm $N_2$ and 2,275 ppm $CO_2$. No carbon monoxide or products of partial oxidation were detected at this temperature.

EXAMPLE VI

A catalyst was prepared containing nominally 1% palladium, 5% vanadium with a balance titania in a manner similar to that described previously. Approximately one gram of the resulting material was exposed to 2,000 ppm (v/v) hydrogen cyanide in 21% $O_2$/He flowing at 200 ml/min at 350° C. and 400° C. At 400° C., the conversion of hydrogen cyanide was greater than 99.95%. The reaction product distribution consisted of 3.9 ppm $NO_x$, 275 ppm $N_2O$, 725 ppm $N_2$ and 2,200 ppm $CO_2$. At 350° C., the conversion of hydrogen cyanide was greater than 99.95%. The reaction product distribution consisted of 4.1 ppm $NO_x$, 350 ppm $N_2O$, 675 ppm $N_2$ and 2,200 ppm $CO_2$. No carbon monoxide or products of partial oxidation were detected at either temperature.

EXAMPLE VII

A catalyst was prepared containing nominally 0.1% palladium, 5% vanadium, 5% lanthanum with a balance titania in a manner similar to that described previously. Approximately one gram of the resulting material was exposed to 2,000 ppm (v/v) hydrogen cyanide in 21% $O_2$/He flowing at 200 ml/min at 400° C. At 400° C., the conversion of hydrogen cyanide was greater than 99.95%. The reaction product distribution consisted of 2.6 ppm $NO_x$, 200 ppm $N_2O$, 665 ppm $N_2$ and 1,825 ppm $CO_2$. No carbon monoxide or products of partial oxidation were detected at either temperature.

EXAMPLE VIII

A catalyst was prepared containing nominally 3% palladium, 5% vanadium, 5% lanthanum with a balance titania in a manner similar to that described previously. Approximately one gram of the resulting material was exposed to 2,000 ppm (v/v) hydrogen cyanide in 21% $O_2$/He flowing at 200 ml/min at 350° C. At 350° C., the conversion of hydrogen cyanide was greater than 99.95%. The reaction product distribution consisted of less than 0.5 ppm $NO_x$, 135 ppm $N_2O$, 800 ppm $N_2$ and 2,025 ppm $CO_2$. No carbon monoxide or products of partial oxidation were detected at this temperature.

EXAMPLE IX

A catalyst was prepared containing nominally 1% palladium, 7% molybdenum with a balance titania in a manner similar to that described previously. Approximately one gram of the resulting material was exposed to 2,000 ppm (v/v) hydrogen cyanide in 21% $O_2$/He flowing at 200 ml/min at 330° C. and 370° C. At 370° C., the conversion of hydrogen cyanide was greater than 99.95%. The reaction product distribution consisted of 2.1 ppm $NO_x$, 60 ppm $N_2O$, 825 ppm $N_2$ and 1,950 ppm $CO_2$. At 330° C., the conversion of hydrogen cyanide was greater than 99.95%. The reaction product distribution consisted of 5.8 ppm $NO_x$, 100 ppm $N_2O$, 850 ppm $N_2$ and 2,000 ppm $CO_2$. No carbon monoxide or products of partial oxidation were detected at either temperature.

EXAMPLE X

A catalyst was prepared containing nominally 1% palladium, 5% vanadium, 5% lanthanum with a balance titania in a manner similar to that described previously. Approximately one gram of the resulting material was exposed to 2,000 ppm (v/v) diethylamine in 21% $O_2$/He flowing at 200 ml/min at 350° C. At 350° C., the conversion of hydrogen cyanide was greater than 99.95%. The reaction product distribution consisted of 7.8 ppm $NO_x$, 120 ppm $N_2O$, 850 ppm $N_2$ and 7,700 ppm $CO_2$. No carbon monoxide or products of partial oxidation were detected at either temperature.

EXAMPLE XI

A catalyst was prepared containing nominally 1% palladium, 5% vanadium, 5% lanthanum with a balance titania in a manner similar to that described previously. Approximately one gram of the resulting material was exposed to 2,000 ppm (v/v) hydrogen cyanide in 21% $O_2$/He flowing at 200 ml/min at 380° C. and 320° C. At 380° C., the conversion of hydrogen cyanide was greater than 99.95%. The reaction product distribution consisted of 50 ppm $NO_x$, 100 ppm $N_2O$, 600 ppm $N_2$ and 1,950 ppm $CO_2$. At 320° C., the conversion of hydrogen cyanide was greater than 99.95%. The reaction product distribution consisted of less than 0.5 ppm $NO_x$, 80 ppm $N_2O$, 500 ppm $N_2$ and 1,820 ppm $CO_2$. No carbon monoxide or products of partial oxidation were detected at either temperature.

EXAMPLE XII

A catalyst was prepared containing nominally 1% palladium, 5% vanadium, 5% lanthanum with a balance titania in a manner similar to that described previously. Approximately one gram of the resulting material was exposed to 2,000 ppm (v/v) hydrogen cyanide in 750 ppm $NO_2$ in 21% $O_2$/He flowing at 200 ml/min at 350° C. and 390° C. At 390° C., the conversion of hydrogen cyanide was greater than 99.95%. The concentration of nitrogen and carbon species in the reactor effluent was as follows: 21 ppm $NO_x$, 175 ppm $N_2O$, 1,150 ppm $N_2$ and 2,200 ppm $CO_2$. At 350° C., the conversion of hydrogen cyanide was greater than 99.95%. The concentration of nitrogen and carbon species in the reactor effluent was as follows: less than 0.5 ppm $NO_x$, 100 ppm $N_2O$, 1.225 ppm $N_2$ and 2,175 ppm $CO_2$. No carbon monoxide or products of partial oxidation were detected at either temperature. Results demonstrate that the catalyst and process are capable of reducing $NO_x$ in a process stream containing $NO_x$ hydrogen cyanide and oxygen.

EXAMPLE XIII

A catalyst was prepared containing nominally 1% palladium, 5% vanadium, 5% lanthanum with the balance titania in a manner similar to that described previously. Approximately one gram of the resulting material was exposed to 500 ppm (v/v) hydrogen cyanide in 21% $O_2$/He flowing at 200 ml/min at 310° C. and 350° C. At 350° C., the conversion of hydrogen cyanide was greater than 99.95%. The reaction product distribution consisted of 3.9 ppm $NO_x$, 25 ppm $N_2O$, 210 ppm $N_2$ and 475 ppm $CO_2$. At 310° C., the conversion of hydrogen cyanide was approximately 99.95%. The reaction product distribution consisted of 5.1 ppm $NO_x$, 27 ppm $N_2O$, 200 ppm $N_2$ and 465 ppm $CO_2$. No carbon monoxide or products of partial oxidation were detected at these reaction temperatures.

EXAMPLE XIV

A catalyst was prepared containing nominally 1% palladium, 10% vanadium, 5% lanthanum with the balance titania in a manner similar to that described previously. Approximately one gram of the resulting material was exposed to 2,000 ppm (v/v) hydrogen cyanide in 21% $O_2$/He flowing at 200 ml/min at 340° C. and 400° C. At 400° C., the conversion of hydrogen cyanide was greater than 99.95%. The reaction product distribution consisted of 9 ppm $NO_x$, 140 ppm $N_2O$, 775 ppm $N_2$ and 2,100 ppm $CO_2$. At 340° C., the conversion of hydrogen cyanide was approximately 99.95%. The reaction product distribution consisted of less than 0.5 ppm $NO_x$, 170 ppm $N_2O$, 650 ppm $N_2$ and 2,100 ppm $CO_2$. No carbon monoxide or products of partial oxidation were detected at these reaction temperatures.

EXAMPLE XV

A catalyst was prepared containing nominally 5% iron, 5% vanadium, 5% lanthanum with the balance titania in a manner similar to that described previously. Approximately one gram of the resulting material was exposed to 2,000 ppm (v/v) hydrogen cyanide in 21% $O_2$/He flowing at 200 ml/min at 400° C. At 400° C., the conversion of hydrogen cyanide was greater than 99.5%. The reaction product distribution consisted of 15.3 ppm $NO_x$, 200 ppm $N_2O$, 600 ppm $N_2$ and 2,100 ppm $CO_2$. No carbon monoxide or products of partial oxidation were detected at this reaction temperature.

EXAMPLE XVI

A catalyst was prepared containing nominally 5% nickel, 5% vanadium, 5% lanthanum with the balance titania in a manner similar to that described previously. Approximately one gram of the resulting material was exposed to 2,000 ppm (v/v) hydrogen cyanide in 21% $O_2$/He flowing at 200 ml/min at 400° C. At 400° C., the conversion of hydrogen cyanide was greater than 99.95%. The reaction product distribution consisted of 6.8 ppm $NO_x$, 210 ppm $N_2O$, 650 ppm $N_2$ and 2,125 ppm $CO_2$. No carbon monoxide or products of partial oxidation were detected at this reaction temperature.

EXAMPLE XVII

A catalyst was prepared containing nominally 1% palladium, 5% vanadium, 5% lanthanum with the balance titania in a manner similar to that described previously. Approximately 0.87 g of the resulting material was exposed to 2,000 ppm (v/v) cyanogen chloride in 21% $O_2$/He with 1.5% $H_2O$ (v/v) flowing at 175 ml/min at 200°, 300° and 400° C. At 200° C., the conversion of cyanogen chloride was greater than 99.9%. The reaction product distribution consisted of 20 ppm $NO_x$, less than 5 ppm $N_2O$, 965 ppm $N_2$ and 1,950 ppm $CO_2$. At 300° C., the conversion of cyanogen chloride was greater than 99.9%. The reaction product distribution consisted of 145 ppm $NO_x$, less than 5 ppm $N_2O$, 900 ppm $N_2$ and 1,950 ppm $CO_2$. At 400° C., the conversion of cyanogen chloride was greater than 99.9%. The reaction product distribution consisted of 240 ppm $NO_x$, 200 ppm $N_2O$, 575 ppm $N_2$ and 1,950 ppm $CO_2$. No carbon monoxide or products of partial oxidation were detected at these reaction temperatures. No determination or measurement was made of a concentration of Hcl, which was present in the exiting treated gas stream.

EXAMPLE XVIII

A catalyst was prepared containing nominally 1% palladium, 3% tungsten, 5% lanthanum with the balance titania in a manner similar to that described previously. Approximately one gram of the resulting material was exposed to 2,000 ppm (v/v) hydrogen cyanide in 21% $O_2$/He flowing at 100 ml/min at 340° C. At 340° C., the conversion of hydrogen cyanide was greater than 99.95%. The reaction product distribution consisted of 75 ppm $NO_x$, 85 ppm $N_2O$, 800 ppm $N_2$ and 2,100 ppm $CO_2$. No carbon monoxide or products of partial oxidation were detected at either temperature.

It should be noted that other formulations of the catalyst used within the parameters described herein could be successfully employed in the process according the present invention as well as choosing other operating parameters to meet a given application and level of effectiveness suitable to the application without departing from the spirit of the present invention. The selective oxidation achieved to produce the lower levels of $NO_x$ generated in the reaction products is generally most desirable. This selectivity of the components formed by the oxidation reactions which can readily reduce the amount of $NO_x$ in the exiting treated gas stream represents a significant advantage over prior abatement processes used to treat VNC ladened gas streams.

We claim:

1. A catalyst for the catalytic oxidation of VNC's with limited production of $NO_x$ compounds, said catalyst comprising:

at least one compound selected from the group consisting of titanium oxide and zirconium oxide, from about 1% to about 20% by weight of an element selected from the group consisting of molybdenum, tungsten, and vanadium, from about 0.03% to about 5% by weight of a metal selected from the group consisting of platinum or palladium, and from about 1% to about 10% by weight lanthanum.

2. The catalyst of claim 1, wherein said metal is present in an amount from about 0.1% to about 3% by weight.

3. The catalyst of claim 1, wherein said element is vanadium and is present in an amount from about 3% to about 7% by weight vanadium.

4. A catalyst for treating gaseous streams containing VNC's with reduced production of $NO_x$ compounds, said catalyst comprising:

from about 0.1% to about 3.0% by weight of a noble metal;

from about 3.0% to about 7% by weight vanadium; and titania.

5. The catalyst of claim 4, wherein said noble metal is selected from the group consisting of platinum and palladium.

6. The catalyst of claim 4, further comprising zirconia.

7. A catalyst for treating VNC's in a gaseous stream with limited production of $NO_x$ compounds, said catalyst comprising:

a base or noble metal;

an element selected from the group consisting of vanadium, molybdenum, and tungsten; and a support comprising zirconia.

8. The catalyst of claim 7, wherein the noble metal is selected from the group consisting of platinum and palladium.

9. The catalyst of claim 7, wherein the noble metal is present in an amount from about 0.03% to about 5% by weight.

10. The catalyst of claim 7, wherein the base metal is selected from the group consisting of chromium, iron, and nickel.

11. The catalyst of claim 7, wherein the base metal is present in an amount from about 0.1% to about 10% by weight.

12. The catalyst of claim 7, wherein said element is present in an amount from about 1% to about 20% by weight.

13. The catalyst of claim 7, further comprising lanthanum.

14. The catalyst of claim 7, wherein said support further comprises titania.

15. The catalyst of claim 7, wherein said element is vanadium.

* * * * *